United States Patent [19]

Yamamoto et al.

[11] 3,901,898
[45] Aug. 26, 1975

[54] 8-AROYLALKYL-1,3,8-TRIAZASPIRO [4,5] DECANES

[75] Inventors: Hisao Yamamoto, Nishinomiya; Masaru Nakao; Kikuo Sasajima, Toyonaka; Isamu Maruyama, Minoo; Shigenari Katayama, Takarazuka, all of Japan

[73] Assignee: Sumitomo Chemical Co., Ltd., Osaka, Japan

[22] Filed: Nov. 15, 1973

[21] Appl. No.: 416,120

Related U.S. Application Data

[63] Continuation-in-part of Ser. No. 242,759, April 10, 1972, abandoned.

[30] Foreign Application Priority Data

Apr. 15, 1971  Japan.............................. 46-24376
Apr. 15, 1971  Japan.............................. 46-24373

[52] U.S. Cl. ... 260/293.66; 260/293.61; 260/319.1; 260/326.12 R; 260/326.13 R; 260/326.16; 260/471 R; 260/515 R; 260/515 A; 260/521 R; 260/544 M; 260/590; 260/599; 424/267
[51] Int. Cl.². ..................................... C07D 211/26
[58] Field of Search .................. 260/293.66, 293.8

[56] References Cited
UNITED STATES PATENTS

| | | | |
|---|---|---|---|
| 3,155,669 | 11/1964 | Janssen......................... | 260/293.66 |
| 3,839,340 | 10/1974 | Scharpf......................... | 260/293.66 |
| 3,839,341 | 10/1974 | Scharpf et al.................. | 260/293.66 |
| 3,839,342 | 10/1974 | Scharpf......................... | 260/293.66 |

OTHER PUBLICATIONS
C. A., 78:58,426v, (1973), Yamamoto et al., Abstract of Japan, Kokai, 72, 38,971.

*Primary Examiner*—Sherman D. Winters
*Attorney, Agent, or Firm*—Stevens, Davis, Miller & Mosher

[57] ABSTRACT

Aminophenylketone derivatives having excellent psychotropic activities and represented by the formula,

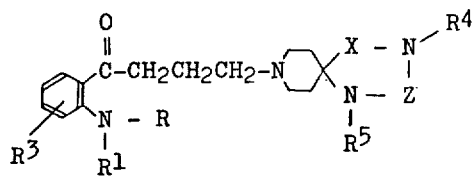

wherein $R^1$ is hydrogen, $C_1$-$C_4$ alkyl or aryl; R is hydrogen or a group having the formula, —$COR^2$ (wherein $R^2$ is hydrogen, $C_1$-$C_4$ alkyl or aryl); $R^3$ is hydrogen, halogen, $C_1$-$C_4$ alkyl, $C_1$-$C_4$ alkoxy or trifluoromethyl; $R^4$ is hydrogen, $C_1$-$C_4$ alkyl or $C_1$-$C_4$ alkanoyl; $R^5$ is $C_1$-$C_4$ alkyl or aryl; X is carbonyl or methylene; and Z is a group having the formula,

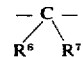

(wherein $R^6$ and $R^7$ are each hydrogen, $C_1$-$C_4$ alkyl, aryl or aralkyl and $R^6$ and $R^7$ may form bivalent $C_2$-$C_5$ alkylene).

15 Claims, No Drawings

8-AROYLALKYL-1,3,8-TRIAZASPIRO [4,5] DECANES

CROSS REFERENCE TO RELATED APPLICATIONS

This is a continuation-in-part of co-pending application Ser. No. 242759 filed on Apr. 10, 1972, now abandoned.

The present invention relates to novel aminophenylketone derivatives useful as medicines and intermediates for medicines and to processes for the production of the same.

More particularly, the present invention relates to novel aminophenylketone derivatives, which have excellent central or autonomic nervous system activities and are important intermediates for producing psychotropic drugs, and to advantageous processes for the production of the same.

The present inventors found that novel aminophenylketone derivatives, having psychotropic, neuroleptic, anti-psychosis, anti-anxiety (sedative), anti-emotional, anti-convulsive or analgesic activities, can be prepared by novel or known-type processes.

Accordingly, the first object of the present invention is to provide novel central or autonomic nervous system active aminophenylketone derivatives.

Another object is to provide processes for producing the said aminophenylketone derivatives.

A further object is to provide a pharmaceutical composition and use of the said aminophenylketone derivatives.

Other objects and merits of the invention will be apparent from the following description.

The present invention provides novel aminophenylketone derivatives represented by the formula (I),

wherein $R^1$ is hydrogen, $C_1$-$C_4$ alkyl or aryl; R is hydrogen or a group having the formula, —$COR^2$ (wherein $R^2$ is hydrogen, $C_1$-$C_4$ alkyl or aryl); $R^3$ is hydrogen, halogen, $C_1$-$C_4$ alkyl, $C_1$-$C_4$ alkoxy or trifluoromethyl; $R^4$ is hydrogen, $C_1$-$C_4$ alkyl or $C_1$-$C_4$ alkanoyl; $R^5$ is $C_1$-$C_4$ alkyl or aryl; X is carbonyl or methylene; and Z is a group having the formula $$-C-\begin{matrix} \\ R^6 \ R^7 \end{matrix}$$

(wherein $R^6$ and $R^7$ are each hydrogen, $C_1$-$C_4$ alkyl, aryl or aralkyl and $R^6$ and $R^7$ may form bivalent $C_2$-$C_5$ alkylene) and acid addition salts thereof.

In the foregoing general formula (I), the term "halogen" includes chlorine, bromine, iodine and fluorine. The term "$C_1$-$C_4$ alkyl" or "$C_1$-$C_4$ alkoxy" includes both straight and branched chain alkyl or alkoxy groups such as methyl, ethyl, n-propyl, isopropyl, n-butyl, methoxy, ethoxy, n-propoxy, isopropoxy and the like.

The term "aryl" includes, preferably, phenyl or substituted phenyl. The substituents may be halogen, $C_1$-$C_4$ alkyl, $C_1$-$C_4$ alkoxy, trifluoromethyl and the like. The term "aralkyl" includes, for example, optionally substituted benzyl, phenethyl and the like. The term "$C_1$-$C_4$ alkanoyl" includes, for example, acetyl, propionyl and the like.

The present invention also provides novel indole derivatives of the formula (IV),

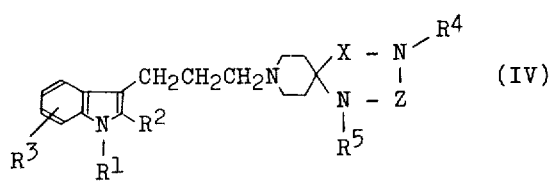

wherein $R^1$, $R^2$, $R^3$, $R^4$, $R^5$, X and Z have the same meanings as defined above, and acid addition salts thereof, which are useful as an intermediate in the present invention and have central or peripheral nervous system actions, and processes for the production of the same.

Further, the present invention provides a process for producing aminophenylketone derivatives represented by the formula (I) or acid addition salts thereof, which comprises reacting an indole compound of the formula (IV),

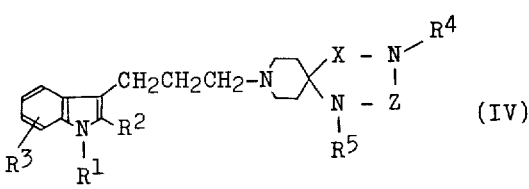

wherein $R^1$, $R^2$, $R^3$, $R^4$, $R^5$, X and Z have the same meanings ad defined above, or an acid addition salt thereof, with an oxidizing agent to yield a compound of the formula (II),

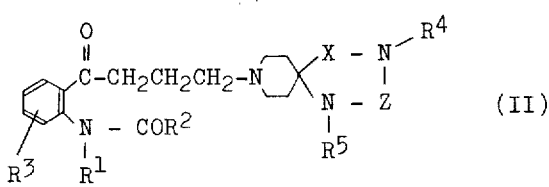

wherein $R^1$, $R^2$, $R^3$, $R^4$, $R^5$, X and Z have the same meanings as defined above, and, if necessary, hydrolyzing the resulting compound of the formula (II) to form a compound of the formula (III),

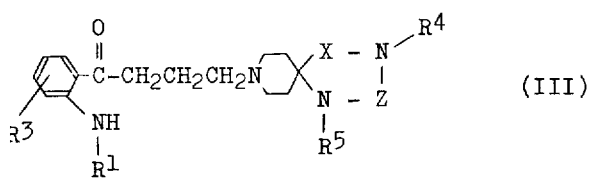

(III)

wherein $R^1$, $R^3$, $R^4$, $R^5$, X and Z have the same meanings as defined above.

Preferable compounds within the formula (I) are those wherein $R^1$ is hydrogen or $C_1$-$C_4$ alkyl, R is hydrogen or a group having the formula, —CO—$R^2$ (wherein $R^2$ is $C_1$-$C_4$ alkyl or aryl), $R^3$ is halogen or hydrogen, and X is carbonyl or methylene.

Particularly, the compounds of the formula,

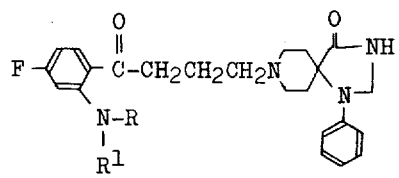

[wherein R is hydrogen or a group having the formula —CO—$R^2$ (wherein $R^2$ is $C_1$-$C_4$ alkyl or aryl) and $R^1$ is hydrogen or $C_1$-$C_4$ alkyl], are most preferable.

According to the present invention, the objective aminophenylketone derivatives of the formula (I) can be prepared by the process as shown in the following synthetic schema:

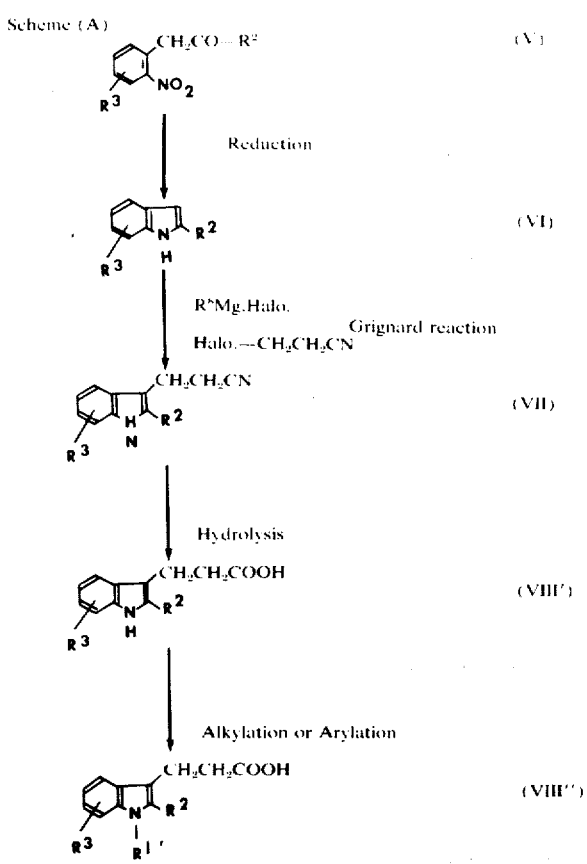

Scheme (B)

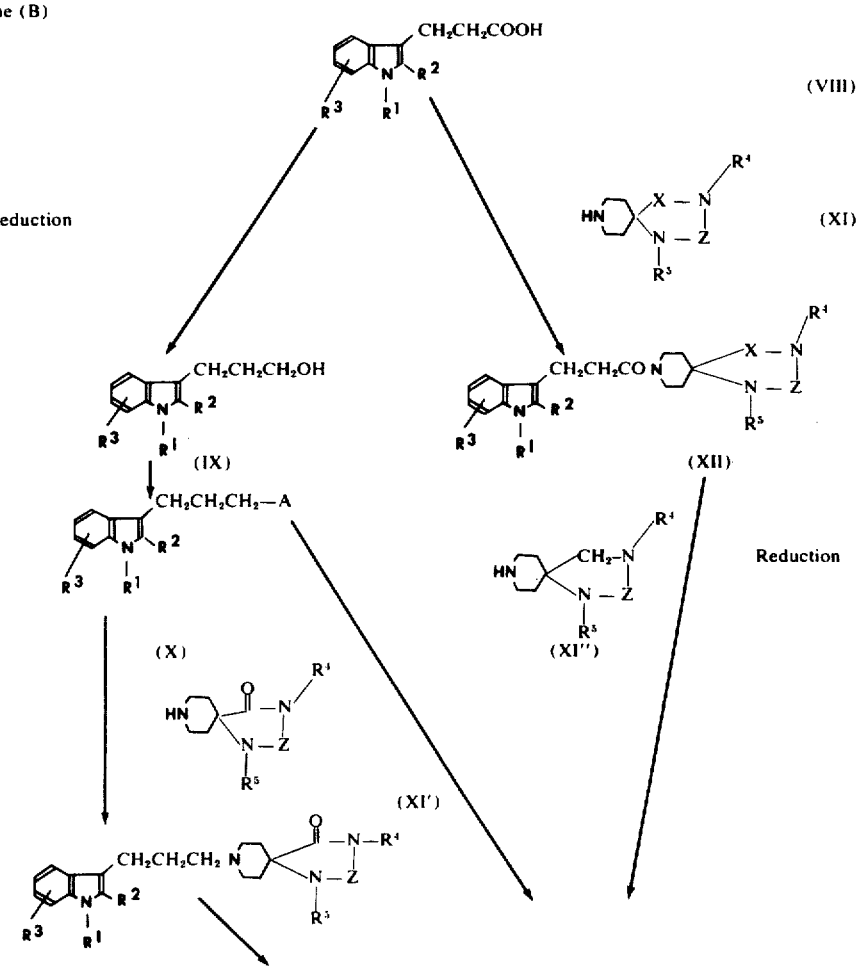

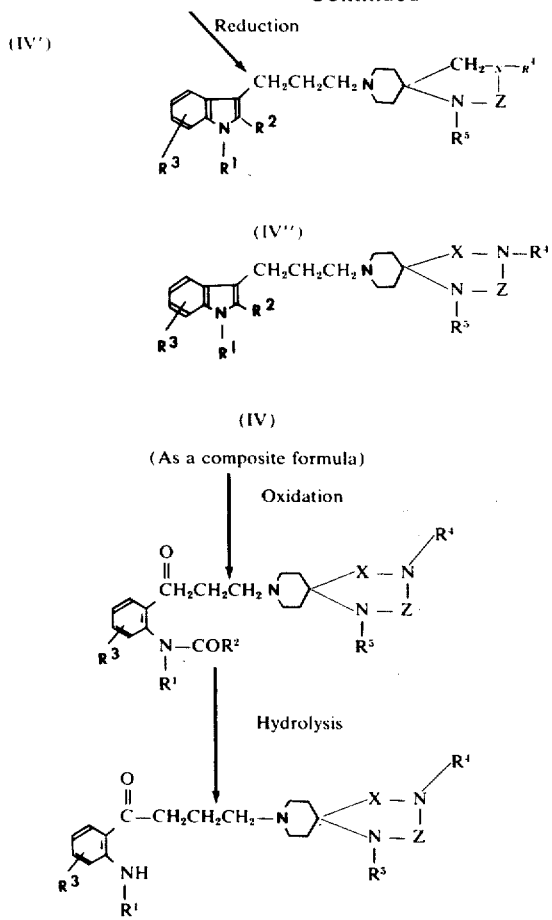

wherein $R^1$ is $C_1$-$C_4$ alkyl or aryl; $R^x$ is $C_1$-$C_3$ alkyl; Halo. is halogen; A is halogen, alkylsulfonyloxy or arylsulfonyloxy group, and $R^1$, $R^2$, $R^3$, $R^4$, $R^5$, X and Z have the same meanings as defined above.

The β-(3-indolyl)propionic acid derivative of the formula (VIII) used as an intermediate in the present invention can be prepared from an o-nitrobenzylketone derivative of the formula (V) by the process shown in the scheme (A), which comprises reducing an o-nitrobenzylketone (V) to an indole derivative of the formula (VI), converting the indole (VI) to its Grignard reagent by a reaction thereof with an alkylmagnesium halide (represented by $R^xMg\cdot Halo.$), reacting the resulting Grignard reagent with β-halogenopropionitrile to yield a β-(3-indolyl)-propionitrile derivative of the formula (VII), hydrolyzing the resulting β-(3-indolyl)propionitrile (VII) to the objective compound of the formula (VIII'), and, if necessary, alkylating or arylating the compound (VIII') to yield the objective compound of the formula (VIII'').

The substituent $R^1$ in the compound of the formula (VIII'') can be also introduced by alkylation or arylation of the compound (VI) or (VII).

The reduction, the first step of the process, is effected in a suitable organic or inorganic solvent using various reducing agents. Examples of the preferable reducing agents include, for example, hydrogen in the presence of a catalyst such as palladium, nickel, platinum, etc., and a metal such as iron, zinc, tin or a salt thereof in an acidic medium. The reduction is conducted easily at a temperature within a range of 10°C to the boiling point of the solvent and the objective compound (VI) is obtained generally in a high yield.

The Grignard reaction, the next step of the process, is conducted easily according to a conventional procelure of the general Grignard reaction. The abovementioned Grignard reagent of the indole (VI) can be prepared by a method well known in the art and the Grignard reaction is preferably carried out in a suitable solvent such as, for example, ether, tetrahydrofuran, dioxane, anisole, benzene, toluene, etc. at a temperature within a range of −10°C to the boiling point of the solvent. After hydrolyzing the resulting product, the obective compound (VII) can be isolated generally in a good yield, which can be used in the subsequent hydrolyzing step without purification.

The hydrolysis of the compound (VII) can be conducted under an acidic or alkaline condition according to an ordinary hydrolysis procedure, and the objective 3-(3-indolyl)propionic acid (VIII') is obtained generally in a high yield.

The $N^1$-alkylation or $N^1$-arylation of the indole compounds (VIII'), (VI) or (VII) is carried out with a suitable alkylating or arylating agent such as, for example, alkyl halide, aryl halide, dialkyl sulfate, alkyl p-toluenesulfonate, etc., in the presence of a basic agent or a condensing agent such as, for example, sodium amide, potassium amide, sodium hydride, sodium hydroxide, sodium carbonate, potassium carbonate, alkyl lithium, phenyllithium, cuprous cyanide, etc. The reaction is generally carried out in a suitable solvent such as ether, tetrahydrofuran, dioxane, benzene, toluene, xylene, chlorobenzene, dimethylformamide, alcohols, liquid amminia and the like at a temperature within a range of 0°C to 140°C, and the objective compound is obtained generally in a high yield.

The o-nitrobenzylketones of the formula (V), which are the starting materials used in the present process, are readily prepared from easily avaiable materials. The following reaction scheme shows one of the examples:

derivative (IX), and it is converted to its halide or sulfonate of the formula (X), and finally a reaction of the compound (X) with a piperidine derivative (XI' or XI'') leads to the objective compound (IV).

The reduction is effected in a suitable organic solvent such as, for example, diethyl ether, di-n-butyl ether, tetrahydrofuran, dioxane, methylal, N-ethylmorpholine, benzene, toluene, etc. using lithium aluminum hydride as a reducing agent, and the objective alcohol derivative (IX) is easily obtained in a high yield.

The conversion of the alcohol derivative (IX) to a compound (X) is conducted by a method known in the art, for example, by the action of phosphorus tribromide, phosphorus pentachloride, phosphorus oxychloride, etc. in a suitable inert solvent, by the action of alkyl- or aryl-sulfonyl chloride in pyridine, or by the action of triphenylphosphine-carbon tetrahalide or triphenylphosphine dihalide. The halide derivative is also obtained from the sulfonate derivative by the action of lithium halide, sodium halide, calcium halide, magnesium halide, etc.

The condensation reaction of the compound (X) with a piperidine derivative (XI' or XI'') can be carried out in a suitable inert solvent such as dimethylformamide, dimethylsulfoxide, an aromatic hydrocarbon, e.g. benzene, toluene or xylene, a lower alkanol, e.g. ethanol, propanol or butanol, a lower alkanone, e.g. acetone, methyl ethyl ketone or methyl isobutyl ketone, a halogenated hydrocarbon, e.g. dichloroethane or chloroform, an ether, e.g. diethyl ether, di-n-butyl ether, tetrahydrofuran or dioxane, or an ester, e.g. ethyl acetate or butyl acetate. In certain cases the reaction can be usefully accelerated by elevated temperatures and preferably by the use of a basic agent or a

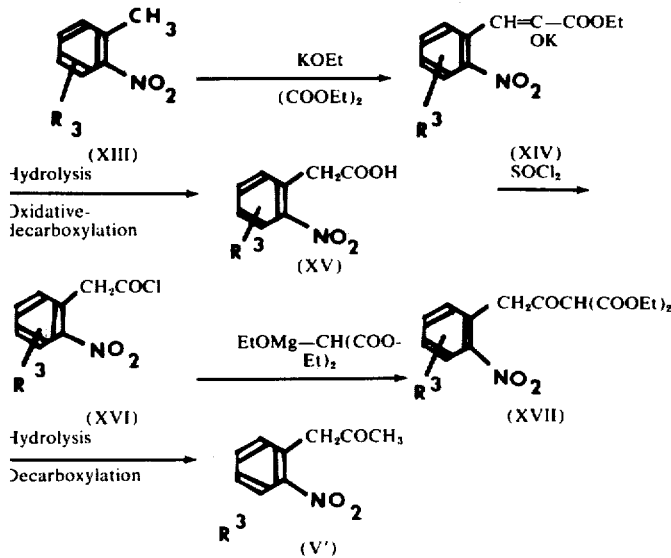

wherein $R^3$ has the same meanings as defined above.

The 3-(γ-piperidinopropyl)indole derivative of the formula (IV), which is used as an intermediate in the present invention, are prepared from a β-(3-indolyl)propionic acid derivative (VIII) by the three routes shown in the scheme (B).

First, the compound (VIII) is reduced to an alcohol condensing agent. Thus, the objective 3-(γ-piperidinopropyl)indole derivatives (IV) is obtained generally in a high overall yield.

The present compound of the formula (IV), in which X is methylene, can be prepared from a β-(3-indolyl)propionic acid (VIII) by a reaction thereof with a piperidine (XI) followed by reduction.

The compound of the formula (XII) is prepared by reacting a compound (VIII) or its functionally active derivative with a piperidine (XI). The said functionally active derivatives are, for example, acid halide, acid anhydride, mixed acid anhydride, p-nitrophenyl ester and the like, and the mixed acid anhydride mentioned above includes one prepared by treating the compound (VIII) with ethyl chloroformate, isobutyl chloroformate or the like. In most cases the reaction as preferably carried out in the presence of a basic agent or a condensing agent such as triethylamine, pyridine, sodium carbonate, dicyclohexylcarbodiimide, etc. in a suitable inert organic solvent.

The compound of the formula (XII) thus obtained is converted to the objective compound (IV″) by reduction. Though various reducing agents may be employed in the reduction, it is especially preferable to use metal halide such as lithium aluminum hydride in an inert organic solvent such as, for example, ether, tetrahydrofuran, dioxane, benzene, toluene, etc.

The compound of the formula (IV), in which X is methylene, can be also prepared from the compound of the formula (IV′) by reduction.

Though various reducing agents may be employed in the reduction, it is especially preferable to use metal halide such as lithium aluminum hydride in an inert organic solvent such as, for example, ether, tetrahydrofuran, dioxane, benzene, toluene, etc.

The thus obtained 3-(γ-piperidinopropyl)indole compound of the formula (IV) can be converted to the corresponding inorganic or organic acid addition salts by a procedure known in the art.

By the above-mentioned procedure, the 3-(γ-piperidinopropyl)indole derivatives of the formula (IV) are easily synthesized in a high overall yield, examples of which are as follows.

8-[γ-(2-Methyl-3-indolyl)propyl]-4-oxo-1-phenyl-1,3,8-triazaspiro[4,5]decane
8-[γ-(2-Methyl-6-fluoro-3-indolyl)propyl]-4-oxo-1-phenyl-1,3,8-triazaspiro[4,5]decane
8-[γ-(6-Fluoro-3-indolyl)propyl]-4-oxo-1-phenyl-1,3,8-triazaspiro[4,5]decane
8-[γ-(1-Ethyl-6-fluoro-3-indolyl)propyl]-4-oxo-1-phenyl-1,3,8-triazaspiro[4,5]decane
8-[γ-(1-Ethyl-2-methyl-6-fluoro-3-indolyl)propyl]-4-oxo-1-phenyl-1,3,8-triazaspiro[4,5]decane
8-[γ-(1-Phenyl-2-methyl-6-fluoro-3-indolyl)propyl]-4-oxo-1-phenyl-1,3,8-triazaspiro[4,5]-decane
8-[γ-(1,2-Dimethyl-6-fluoro-3-indolyl)propyl]-4-oxo-1-phenyl-1,3,8-triazaspiro[4,5]decane
8-[γ-2-Methyl-6-fluoro-3-indolyl)propyl]-1-phenyl-1,3,8-triazaspiro[4,5]decane
8-[γ-(6-Fluoro-3-indolyl)propyl]-1-phenyl-1,3,8-triazaspiro[4,5]decane
8-[γ-(1-Ethyl-2-methyl-6-fluoro-3-indolyl)propyl]-1-phenyl-1,3,8-triazaspiro[4,5]decane
8-[γ-(1,2-Dimethyl-6-fluoro-3-indolyl)propyl]-1-phenyl-1,3,8-triazaspiro[4,5-]decane
8-[γ-(2-Methyl-6-fluoro-3-indolyl)propyl]-4-oxo-3-methyl-1-phenyl-1,3,8-triazaspiro[4,5]decane
8-[γ-(2-Methyl-6-fluoro-3-indolyl)propyl]-4-oxo-3-acetyl-1-phenyl-1,3,8-triazaspiro[4,5]decane
8-[γ-(2-Methyl-6-fluoro-3-indolyl)propyl]-3-methyl-1-phenyl-1,3,8-triazaspiro[4,5]decane
8-[γ-(2-Methyl-6-fluoro-3-indolyl)propyl]-3-ethyl-1-phenyl-1,3,8-triazaspiro[4,5]decane
8-[γ-(2-Methyl-6-fluoro-3-indolyl)propyl]-4-oxo-2-methyl-1-phenyl-1,3,8-triazaspiro[4,5]decane
8-[γ-(2-Methyl-6-fluoro-3-indolyl)propyl]-2-methyl-1-phenyl-1,3,8-triazaspiro[4,5]decane
8-[γ-(2-Methyl-6-fluoro-3-indolyl)propyl]-4-oxo-1-isopropyl-1,3,8-triazaspiro[4,5]decane
8-[γ-(2-Methyl-6-fluoro-3-indolyl)propyl]-4-oxo-1-p-tolyl-1,3,8-triazaspiro[4,5]decane
8-[γ-(2-Phenyl-6-fluoro-3-indolyl)propyl]-4-oxo-1-phenyl-1,3,8-triazaspiro[4,5]decane
8-[γ-(2-Methyl-6-fluoro-3-indolyl)propyl]-4-oxo-1-p-anisyl-1,3,8-triazaspiro[4,5]decane
8-[γ-(2-Methyl-6-fluoro-3-indolyl)propyl]-4-oxo-1-p-chlorophenyl-1,3,8-triazaspiro[4,5]decane
8-[γ-(2-Methyl-6-fluoro-3-indolyl)propyl]-4-oxo-p-fluorophenyl-1,3,8-triazaspiro[4,5]decane
8-[γ-(2-Methyl-5-fluoro-3-indolyl)propyl]-4-oxo-1-phenyl-1,3,8-triazaspiro[4,5]decane
8-[γ-(2-Methyl-6-methoxy-3-indolyl)propyl]-4-oxo-1-phenyl-1,3,8-triazspiro[4,5-]decane
8-[γ-(2-Methyl-6-trifluoromethyl-3-indolyl)propyl]-4-oxo-1-phenyl-1,3,8-triazaspiro[4,5]decane Aminophenylketones of the formula (II) can be prepared by contacting the above-obtained 3-γ-piperidinopropylindoles of the formula (IV) or an acid addition salt thereof, with an oxidizing agent. In the oxidative cleavage reaction, it is preferred to use an oxidizing agent such as ozone, hydrogen peroxide, performic acid, peracetic acid, perbenzoic acid, chromic acid, potassium permanganate, or sodium periodate although the oxidizing agent of the present invention is not limited to the exemplified ones and others may be used.

Generally, the reaction proceeds readily at room temperature, but the temperature may be higher or lower if necessary to effect the desired control of the reaction. The oxidizing agent is preferably chromic acid or ozone. The reaction is preferably effected in the presence of a solvent. The choice of solvent depends on the oxidizing agent employed, and is selected from the group consisting of water, acetone, carbon tetrachloride, chloroform, acetic acid, formic acid, sulfuric acid and the like. The oxidizing agent is used in a stoichiometric amount or more. The reaction temperature varies depending on the oxidizing agent employed.

When the oxidation is carried out by use of chromic acid in the presence of acetic acid, it is preferable that the chromic acid may be used in 2 – 3 times the equimolar amount and that the reaction may be carried out at room temperature. A 3-(γ-piperidinopropyl)indole derivative or an acid addition salt thereof is dissolved or suspended in a solvent and an oxidizing agent is added to the solution or suspension with stirring. Generally, the reaction terminates within about 24 hours.

When the oxidation is carried out by use of ozone, the reaction is preferably carried out at room temperature. A 3-(γ-piperidinopropyl)indole derivative or an acid addition salt thereof is dissolved or suspended in a solvent such as formic acid, acetic acid, carbon tetrachloride or the like and ozonized oxygen is bubbled into the solution or suspension with stirring.

The desired aminophenylketone derivative (II) can be separated from the reaction mixture in a crude form by extraction or filtration, with or without prior neutralization. The product is further purified, if desired, by recrystallization from a suitable solvent such as ethanol, isopropanol or the like in a standard manner.

The resulting compound of the formula (II) can be hydrolyzed to give the corresponding deacylated compound of the formula (III). The hydrolysis is accomplished under an acidic or alkaline condition according to an ordinary hydrolysis procedure.

The thus obtained aminophenylketone derivative of the formula (I) can be converted to the corresponding inorganic or organic acid addition salts by a procedure known in the art. These salts include pharmaceutically acceptable ones, e.g. hydrochloride, hydrobromide, sulfate, phosphate, sulfamate, citrate, lactate, maleate, malate, succinate, tartrate, cinnamate, acetate, benzoate, gluconate, ascorbate and the like.

According to the method mentioned above, the following aminophenylketones can be easily synthesized:

8-[γ-(2-Acetaminobenzoyl)propyl]-4-oxo-1-phenyl-1,3,8-triazaspiro[4,5]decane
8-[γ-(2-Acetamino-4-fluorobenzoyl)propyl]-4-oxo-1-phenyl-1,3,8-triazaspiro[4,5]decane
8-[γ-(2-Amino-4-fluorobenzoyl)propyl]-4-oxo-1-phenyl-1,3,8-triazaspiro[4,5]decane
8-[γ-(2-Ethylamino-4-fluorobenzoyl)propyl]4-oxo-1-phenyl-1,3,8-triazaspiro[4,5]decane
8-[γ-(2-Benzoylamino-4-fluorobenzoyl)propyl]4-oxo-1-phenyl-1,3,8-triazaspiro[4,5]decane
8-[γ-(2-Methylamino-4-fluorobenzoyl)propyl]4-oxo-1-phenyl-1,3,8-triazaspiro[4,5]decane
8-[γ-(2-N-Ethylacetamino-4-fluorobenzoyl)propyl]-4-oxo-1-phenyl-1,3,8-triazaspiro[4,5]decane
8-[γ-(2-Acetamino-4-fluorobenzoyl)propyl]1-phenyl-1,3,8-triazaspiro[4,5]decane
8-[γ-(2-Amino-4-fluorobenzoyl)propyl]-1-phenyl-1,3,8-triazaspiro[4,5]decane
8[γ-(2-Ethylamino-4-fluorobenzoyl)propyl]1-phenyl-1,3,8-triazaspiro[4,5]decane
8-[γ-(2-Methylamino-4-fluorobenzoyl)propyl]1-phenyl-1,3,8-triazaspiro[4,5]decane
8-[γ-(2-N-Methylacetamino-4-fluorobenzoyl)propyl]-4-oxo-1-phenyl-1,3,8-triazaspiro[4,5]decane
8-[γ-(2-Acetamino-4-fluorobenzoyl)propyl]4-oxo-3-methyl-1-phenyl-1,3,8-triazspiro[4,5]decane
8-[γ-(2-Acetamino-4-fluorobenzoyl)propyl]4-oxo-3-acetyl-1-phenyl-1,3,8-triazaspiro[4,5]decane
8-[γ-(2-Acetamino-4-fluorobenzoyl)propyl]4-oxo-3-propanoyl-1-phenyl-1,3,8-triazaspiro[4,5]decane
8-[γ-(2-Amino-4-fluorobenzoyl)propyl]-4-oxo-3-methyl-1-phenyl-1,3,8-triazaspiro[4,5]decane
8-[γ-(2-Amino-4-fluorobenzoyl)propyl]-4-oxo-3-acetyl-1-phenyl-1,3,8-triazaspiro[4,5]decane
8-[γ-(2-Acetamino-4-fluorobenzoyl)propyl]3-methyl-1-phenyl-1,3,8-triazaspiro[4,5]decane
8-[γ-(2-Acetamino-4-fluorobenzoyl)propyl]3-acetyl-1-phenyl-1,3,8-triazaspiro[4,5]decane
8-[γ-(2-Acetamino-4-fluorobenzoyl)propyl]3-ethyl-1-phenyl-1,3,8-triazaspiro[4,5]decane
8-[γ-(2-Amino-4-fluorobenzoyl)propyl]-3-methyl-1-phenyl-1,3,8-triazaspiro[4,5]decane
8-[γ-(2-Acetamino-4-fluorobenzoyl)propyl]4-oxo-2-methyl-1-phenyl-1,3,8-triazaspiro[4,5]decane
8-[γ-(2-Acetamino-4-fluorobenzoyl)propyl]-2-methyl-1-phenyl-1,3,8-triazaspiro[4,5]decane
8-[γ-(2-Acetamino-4-fluorobenzoyl)propyl]4-oxo-1-methyl-1,3,8-triazaspiro[4,5]decane
8γ-(2-Acetamino-4-fluorobenzyl)propyl]4-oxo-1-n-propyl-1,3,8-triazaspiro[4,5]decane
8-[γ-(2-Acetamino-4-fluorobenzoyl)propyl]-4-oxo-1-isopropyl-1,3,8-triazaspiro[4,5]decane
8-[γ-(2-Acetamino-4-fluorobenzoyl)propyl]4-oxo-1-n-butyl-1,3,8-triazaspiro[4,5]decane
8-[γ-(2-Acetamino-4-fluorobenzoyl)propyl]4-oxo-1-p-tolyl-1,3,8-triazaspiro[4,5]decane
8-[γ-(2-Acetamino-4-fluorobenzoyl)propyl]4-oxo-1-p-anisyl-1,3,8-triazaspiro[4,5]decane
8-[γ-(2-Acetamino-4-fluorobenzoyl)propyl]-4-oxo-1-p-chlorophenyl-1,3,8-triazaspiro[4,5]decane
8-[γ-(2-Acetamino-4-fluorobenzoyl)propyl]4-oxo-1-p-fluorophenyl-1,3,8-triazaspiro[4,5]decane
8-[γ-(2-Acetamino-4-fluorobenzoyl)propyl]1-p-fluorophenyl-1,3,8-triazaspiro[4,5]decane
8-[γ-(2-Acetamino-5-fluorobenzoyl)propyl]4-oxo-1-phenyl-1,3,8-triazaspiro[4,5]decane
8-[γ-(2-Acetamino-4-chlorobenzoyl)propyl]4-oxo-1-phenyl-1,3,8-triazaspiro[4,5]decane
8-[γ-(2-Acetamino-4-methoxybenzoyl)propyl]4-oxo-1-phenyl-1,3,8-triazaspiro[4,5]decane
8-[γ-(2-Acetamino-4-methylbenzoyl)propyl]4-oxo-1-phenyl-1,3,8-triazaspiro[4,5]decane
8-[γ-(2-Acetamino-4-trifluoromethylbenzoyl)propyl]-4-oxo-1-phenyl-1,3,8-triazaspiro[4,5]decane Novel aminophenylketone derivatives within the formulas (I) and their pharmaceutically acceptable acid addition salts have central nervous system activities and are useful as psychotropic, neuroleptic, anti-psychosis, anti-anxiety (sedative), anti-emotional, anti-convulsive, and analgesic agents.

The pharmacological evaluation has demonstrated that they possess a variety of depresant activities on central or autonomic nervous system.

The present compounds are more effective on a conditional avoidance response in rats. They also possess anti-apomorphine and anti-methamphetamine activities greater than those of chloropromazine.

While the compounds of the present invention have many beneficial activities, they scarcely show any toxic symptoms, and it may safely be said that these compounds are of great value in practical use. Each of the pharmaceutically active compounds of the invention may be incorporated, e.g. in a tablet as the sole active ingredient for oral administration and may be quite useful an anti-anxiety, anti-psychotonic, anti-emotional, anti-convulsive, anti-psychosis or analgesic drugs. A typical tablet is constituted by from 1 to 2 per cent of a binder, e.g. tragacanth; from 3 to 10 per cent of a lubricant, e.g. talcum; from 0.25 – 1.0 per cent of a lubricant, e.g. magnesium stearate; an average dose of the active ingredient; and q.s. 100 per cent of a filler, e.g. lactose. The usual oral dosage is 1 – 100 mg per os daily.

The following examples are given to illustrate the process of the present invention in more detail.

REFERENTIAL EXAMPLE

A. To a stirred solution of potassium ethylate (prepared from 6.73 g of potassium and 57 ml of anhydrous ethanol) in 180 ml of anhydrous ether was added dropwise 25.1 g of diethyl oxalate at a temperature below 15°C. After the addition was completed, 23.3 g of 4-fluoro-2-nitrotoluene was added dropwise at a temperature below 20°C. While the reaction mixture was stirred for 20 hours, the potassium salt of ethyl o-nitrophenylpyruvate was separated, which was filtered and washed with anhydrous ether until the filtrate became colorless. The yield of the dried salt was 40 g.

B. A mixture of potassium salt of ethyl o-nitrophenylpyruvate (32.0 g), 30 ml of a 10% aqueous potassium hydroxide solution and 150 ml of water was stirred for 2 hours at room temperature. Under vigorous stirring 108 ml of a 30 % aqueous hydrogen peroxide solution was added dropwise thereto at a temperature below 15°C and then the resulting mixture was stirred at room temperature for about 20 hours. After insoluble substances were filtered off, the filtrate was acidified with a 20 % aqueous sulfuric acid solution. The resulting precipitate was collected to give 19.0 g of 4-fluoro-2-nitrophenylacetic acid melting at 150°C.

C. After a mixture of 16.0 g of 4-fluoro-2-nitrophenylacetic acid and 25 ml of thionyl chloride was stirred for 3 hours at room temperature and heated for 4 hours at a temperature of 50° – 60°C, excess thionyl chloride was evaporated under a reduced pressure. After removal of the volatile substances by the addition of portions of benzene (3 × 30 ml) and the subsequent evaporation, 4-fluoro-2-nitrophenylacetyl chloride was obtained as an oily residue.

To a stirred solution of magnesium ethoxy derivative of diethyl malonate, prepared from 2.92 g of magnesium, 14 ml of anhydrous ethanol and 19.2 g of diethyl malonate by a conventional procedure, in 15 ml of anhydrous ether was added dropwise a solution of the acid chloride obtained above in 25 ml of anhydrous benzene at a temperature of 30° – 35°C. After the reaction mixture was refluxed for 2 hours, the reaction mixture was decomposed by the addition of an aqueous sulfuric acid solution at a temperature below 20°C. After the organic layer was separated, the aqueous layer was extracted with portions of ether. The combined organic layer was washed with water and evaporated to afford a crude product of diethyl (4-fluoro-2-nitrophenyl)acetylmalonate as an oil.

D. The above-obtained diethyl (4-fluoro-2-nitrophenyl)acetylmalonate was dissolved in a solution of 30 ml of acetic acid, 20 ml of water and 5 ml of concentrated sulfuric acid, and refluxed gently until the evolution of carbon dioxide ceased. After cooling, the reaction mixture was made alkaline by the addition of an aqueous sodium hydroxide solution and extracted with ether. The extract was washed with water, dried over anhydrous sodium sulfate and evaporated to dryness. Recrystallization of the solidified residue from aqueous ethanol gave 4-fluoro-2-nitrophenylacetone, melting at 60° – 61°C.

EXAMPLE 1

Step 1

To a solution of 78.9 g of 4-fluoro-2-nitrophenylacetone in 800 ml of 80 % (V/V) acetic acid was added in portions 140 g of zinc dust at a temperature of 70° – 80°C. After the addition was completed, the temperature of the bath was raised to 85° – 90°C and heating was continued for 1 hour. The hot mixture was filtered and the excess of zinc was washed with a little ethanol and ether. The filtrate was diluted with 1 l of water to yield 6-fluoro-2-methylindole, melting at 97° – 99°C.

Step 2

To a stirred etherial solution of ethylmagnesium iodide, which was prepared from 9.8 g of magnesium, 62.7 g of ethyl iodide and 100 ml of dry ether, was added dropwise a solution of 40.0 g of 6-fluoro-2-methylindole in 130 ml of dry ether at a temperature of 2° – 5°C. After the addition was completed, the mixture was refluxed until the evolution of ethane ceased. The resulting mixture was cooled to 5°C and a solution of 24.5 g of β-chloropropionitrile in 50 ml of dry ether was added dropwise thereto at a temperature below 5°C. The temperature of the mixture was raised gradually to the boiling point of ether. After refluxing was continued for 4 hours, the precipitated complex product was decomposed by the addition of moist ether (50 ml), water (50 ml) and 2N acetic acid (40 ml). The etherial layer was separated, washed with water and concentrated to afford β-(6-fluoro-2-methylindolyl)-propionitrile as a crude oil. I.R. $\nu C \equiv N$ 2230 cm$^{-1}$.

Step 3

A mixture of 54.0 g of crude β-(6-fluoro-2-methyl-3-indolyl)propionitrile and 500 ml of a 20 % aqueous potassium hydroxide solution was refluxed until the evolution of ammonia ceased. After the mixture was cooled the insoluble matter, which was the recovered 6-fluoro-2-methylindole, was filtered off and the filtrate was acidified by the slow addition of concentrated hydrochloric acid under vigorous stirring. The separated solid was collected by filtration and dried to give β-(6-fluoro-2-methyl-3-indolyl)propionic acid, melting at 131° – 133°C.

EXAMPLE 2

Step 1

To a stirred solution of β-(6-fluoro-2-methyl-3-indolyl)propionic acid (11.06 g) and triethylamine (5.06 g) in 70 ml of tetrahydrofuran was added dropwise a solution of ethyl chloroformate (5.43 g) in tetrahydrofuran (20 ml) at a temperature below 5°C. After stirring was continued for additional 10 minutes, the reaction mixture was added to a solution of 4-oxo-1-phenyl-1,3,8-triazaspiro[4,5]decane (11.57 g) in chloroform (250 ml) at a temperature below 5°C. After stirring was continued for 5 hours at room temperature, the reaction mixture was washed thoroughly with water, a diluted aqueous sodium carbonate solution and a saturated sodium chloride solution. Evaporation of the organic solvent gave 8-[β-(6-fluoro-2-methyl-3-indolyl)-propionyl]-4-oxo-1-phenyl-1,3,8-triazaspiro[4,5]decane as crystalline powder, melting at 100.0° – 105.0°C.

Step 2

To a stirred mixture of 10.54 g of lithium aluminum hydride and 40 ml of dry ether was added dropwise a solution of 16.0 g of 8-[β-(6-fluoro-2-methyl-3-indolyl)-propionyl]-4-oxo-1-phenyl-1,3,8-triazaspiro[4,5]decane in 220 ml of dry tetrahydrofuran under gentle reflux. Stirring and refluxing were continued for additional 5 hours and the reaction mixture was treated gradually with a mixture of water and tetrahydrofuran under cooling with ice. The resulting mixture was dried by the addition of anhydrous sodium sulfate with stirring and filtered. The filtrate was concentrated to yield 8-[γ-(6-fluoro-2-methyl-3-indolyl)propyl]-1-phenyl-1,3,8-triazaspiro[4,5]decane as crystalline powder, melting at 165.0° – 168.0°C.

EXAMPLE 3

Step 1

To a stirred mixture of 5.72 g of lithium aluminum hydride and 200 ml of dry ether was added dropwise a solution of 22.1 g of β-(6-fluoro-2-methyl-3-indolyl)propionic acid in 200 ml of dry ether under gentle reflux. Stirring and refluxing were continued for 5 hours and the reaction mixture was added dropwise a mixture of water and ether under cooling with ice. The etherial layer was separated and evaporated to dryness. Distillation of the residual oil under reduced pressure gave 6-fluoro-2-methyl-3-(γ-hydroxypropyl)-indole, having a boiling point of 180° – 190°C (0.7 mmHg), which was allowed to stand to solidify, melting point: 66.5° – 68.5°C.

Step 2

To a stirred solution of 10.35 g of 6-fluoro-2-methyl-3-(γ-hydroxypropyl)indole in 100 g of pyridine was added 19.0 g of p-toluenesulfonyl chloride at a temperature below 30°C. After stirring for 2 hours at room temperature, the reaction mixture was poured into water and extracted with ethyl acetate. The extract was washed with diluted hydrochloric acid and evaporated under reduced pressure to give 6-fluoro-2-methyl-3-(γ-p-toluenesulfonyloxypropyl)indole as a crude oil.

The thus obtained tosylate was dissolved in dimethylformamide (150 ml) and thereto 10.5 g of lithium chloride was added at a temperature below 40°C with stirring. After stirring was continued for several hours, the mixture was poured into ice-cold water and extracted with ether. The extract was washed with water, dried over anhydrous sodium sulfate and evaporated to afford 6-fluoro-2-methyl-3-(γ-chloropropyl)indole as an oil, boiling point 172° – 176°C (1.3 mmHg).

Step 3

A stirred mixture of 6-fluoro-2-methyl-3-(γ-chloropropyl)indole (11.28 g), 4-oxo-1-phenyl-1,3,8-triazaspiro[4,5]decane (11.57 g), sodium carbonate (5.3 g), potassium iodide (0.2 g) and dimethylformamide (100 ml) was heated at a temperature of 90° – 100°C for 12 hours. The reaction mixture was then poured into ice-cold water and the separated solid was collected by filtration and recrystallized from ethanol to yield 8-[γ-(6-fluoro-2-methyl-3-indolyl)propyl]-4-oxo-1-phenyl-1,3,8-triazaspiro[4,5]decane, melting at 210.0° – 213.0°C.

Step 4

To a stirred mixture of 5.3 g of lithium aluminum hydride and 20 ml of dry ether was added dropwise a solution of 8 g of 8-[γ-(6-fluoro-2-methyl-3-indolyl)propyl]-4-oxo-1-phenyl-1,3,8-triazaspiro[4,5]-decane in 110 ml of dry tetrahydrofuran under gentle reflux. The resulting mixture was stirred under refluxing and the reaction mixture was treated gradually with a mixture of water and tetrahydrofuran under cooling with ice. The resulting mixture was dried by the addition of anhydrous sodium sulfate with stirring and filtered. The filtrate was concentrated to yield 8-[γ-(6-fluoro-2-methyl-3-indolyl)propyl]-1-phenyl-1,3,8-triazaspiro[4,5]decane as crystalline powder, melting at 165.0° – 168.0°C.

EXAMPLE 4

By the similar procedure to that of Example 2 or 3, the following compounds were obtained:

8-[γ-(1-Ethyl-2-methyl-6-fluoroindolyl)propyl]-4-oxo-1-phenyl-1,3,8-triazaspiro[4,5]decane 8-[γ-(2-Phenyl-6-fluoroindolyl)propyl]-4-oxo-1-phenyl-1,3,8-triazaspiro[4,5]decane 8-[γ-(2-Methyl-6-fluoroindolyl)propyl]-3-acetyl-1-phenyl-1,3,8-triazaspiro[4,5]decane 8-[γ-(6-Fluoroindolyl)propyl]-4-oxo-1-phenyl-1,3,8-triazaspiro[4,5]decane 8-[γ-(6-Fluoroindolyl)propyl]-1-phenyl-1,3,8-triazaspiro[4,5]decane 8-[γ-(1,2-Dimethyl-6-fluoroindolyl)propyl]4-oxo-1-phenyl-1,3,8-triazaspiro[4,5]decane

EXAMPLE 5

Into a solution of 4.0 g of 8-[γ-(6-fluoro-2-methyl-3-indolyl)propyl]-4-oxo-1-phenyl-1,3,8-triazaspiro[4,5]decane in 60 ml of acetic acid was introduced a stream of oxygen containing about 3 % of ozone at a temperature of 15° to 20°C until the dark solution turned clear. The reaction mixture was diluted with water and made alkaline by the slow addition of an aqueous sodium hydroxide solution with vigorous stirring and extracted with chloroform. The extract was washed with water, dried over anhydrous sodium sulfate and evaporated to yield 8-[γ-(2-acetamino-4-fluorobenzoyl)propyl]-4-oxo-1-phenyl-1,3,8-triazaspiro[4,5]decane, melting at 190° – 192.5°C.

EXAMPLE 6

By a similar procedure to that of Example 5, the following compounds were obtained:

8-[γ-(2-Acetamino-4-fluorobenzoyl)propyl]1-phenyl-1,3,8-triazaspiro[4,5]decane

8-[γ-(2-N-Ethylacetamino-4-fluorobenzoyl)propyl]-4-oxo-1-phenyl-1,3,8-triazaspiro[4,5]decane 8-[γ-(2-Acetamino-4-fluorobenzoyl)propyl]3-acetyl-1-phenyl-1,3,8-triazaspiro[4,5]decane 8-[γ-(2-N-Methylacetamino-4-fluorobenzoyl)propyl]-4-oxo-1-phenyl-1,3,8-triazaspiro[4,5]decane 8-[γ-(2-Benzoylamino-4-fluorobenzoyl)propyl]4-oxo-1-phenyl-1,3,8-triazaspiro[4,5]decane, melting point 198° – 200.5°C.

EXAMPLE 7

A solution of 2.25 g of 8-[γ-(2-acetamino-4-fluorobenzoyl)propyl]-4-oxo-1-phenyl-1,3,8-triazaspiro[4,5]decane in 100 ml of ethanol was heated under reflux with 10 ml of concentrated hydrochloric acid for one hour. The reaction mixture was cooled and ethanol was distilled off. The residue was then diluted with water, made alkaline by the addition of an aqueous sodium hydroxide solution and extracted with ethyl acetate. The extract was washed with water and concentrated to dryness. Recrystallization of the residue gave 8-[γ-(2-amino-4-fluorobenzoyl)propyl]-4-oxo-1-phenyl-1,3,8-triazaspiro[4,5]decane, melting at 195°C.

EXAMPLE 8

By a similar procedure to that of Example 7, the following compounds were obtained:

8-[γ-(2-Ethylamino-4-fluorobenzoyl)propyl]4-oxo-1-phenyl-1,3,8-triazaspiro[4,5]decane, melting point 169° – 176°C 8-[γ-(2-Methylamino-4-fluorobenzoyl)propyl]4-oxo-1-phenyl-1,3,8-triazaspiro[4,5]decane, melting point 209° – 211°C 8-[γ-(2-Amino-4-fluorobenzoyl)propyl]-1-phenyl-1,3,8-triazaspiro[4,5]decane

What is claimed is:

1. A compound of the formula,

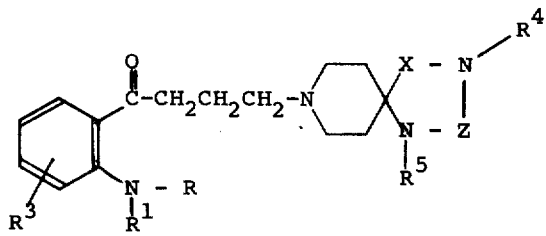

wherein $R^1$ is hydrogen, $C_1$-$C_4$ alkyl or phenyl optionally substituted by one or two substituents selected from the group consisting of halogen, $C_1$-$C_4$ alkyl, $C_1$-$C_4$ alkoxy and trifluoromethyl; R is hydrogen or a group having the formula, —CO—$R^2$ (wherein $R^2$ is hydrogen, $C_1$-$C_4$ alkyl or phenyl optionally substituted by one or two substituents selected from the group consisting of halogen, $C_1$-$C_4$ alkyl, $C_1$-$C_4$ alkoxy and trifluoromethyl; $R^3$ is hydrogen, halogen, $C_1$-$C_4$ alkyl, $C_1$-$C_4$ alkoxy or trifluoromethyl; $R^4$ is hydrogen, $C_1$-$C_4$ alkyl or $C_1$-$C_4$ alkanoyl; $R^5$ is $C_1$-$C_4$ alkyl or phenyl optionally substituted by one or two substituents selected from the group consisting of halogen, $C_1$-$C_4$ alkyl, $C_1$-$C_4$ alkoxy and trifluoromethyl; X is carbonyl or methylene; and Z is a group having the formula

(wherein $R^6$ and $R^7$ are each hydrogen, $C_1$-$C_4$ alkyl, phenyl optionally substituted by one or two substituents selected from the group consisting of halogen, $C_1$-$C_4$ alkyl, $C_1$-$C_4$ alkoxy and trifluoromethyl or benzyl or phenethyl optionally substituted on the benzene ring by one or two substituents selected from the group consisting of halogen, $C_1$-$C_4$ alkoxy and trifluoromethyl and $R^6$ and $R^7$ may form bivalent $C_2$-$C_5$ alkylene), or a pharmaceutically acceptable acid addition salt thereof.

2. A compound according to claim 1, wherein $R^3$ is halogen or hydrogen.

3. A compound according to claim 1, wherein $R^1$ is hydrogen or $C_1$-$C_4$ alkyl.

4. A compound of the formula,

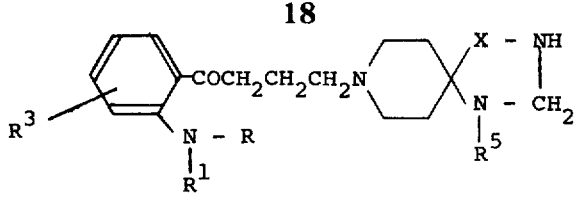

wherein $R^1$ is a hydrogen atom or a $C_1$-$C_4$alkyl group; R is a hydrogen atom or a group having the formula, —COR$^2$ (wherein $R^2$ is a $C_1$-$C_4$ alkyl group or an phenyl optionally substituted by one or two substituents selected from the group consisting of halogen, $C_1$-$C_4$ alkyl, $C_1$-$C_4$ alkoxy and trifluoromethyl group); $R^3$ is halogen or hydrogen; X is carbonyl or methylene; and $R^5$ is phenyl optionally substituted by one or two substituents selected from the group consisting of halogen, $C_1$-$C_4$ alkyl, $C_1$-$C_4$ alkoxy and trifluoromethyl, or a pharmaceutically acceptable acid addition salt thereof.

5. A compound according to claim 4, wherein $R^3$ is fluorine.

6. A compound according to claim 4, wherein X is carbonyl.

7. A compound according to claim 4, wherein $R^5$ is phenyl.

8. A compound of the formula

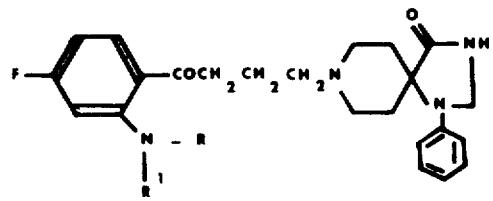

wherein R is hydrogen or a group having the formula, —COR$^2$ (wherein $R^2$ is $C_1$-$C_4$ alkyl or phenyl optionally substituted by one or two substituents selected from the group consisting of halogen, $C_1$-$C_4$ alkyl, $C_1$-$C_4$ alkoxy and trifluoromethyl; $R^1$ is hydrogen or $C_1$-$C_4$ alkyl, or a pharmaceutically acceptable acid addition salt thereof.

9. A compound according to claim 8, wherein $R^1$ is hydrogen, methyl or ethyl.

10. A compound according to claim 8, wherein R is hydrogen, acetyl or benzoyl.

11. 8-[γ-(2-Amino-4-fluorobenzoyl)propyl]-1phenyl-4-oxo-1,3,8-triazaspiro[4,5]decane.

12. 8-[γ-(2-Methylamino-4-fluorobenzoyl)propyl]1-phenyl-4-oxo-1,3,8-triazaspiro[4,5]decane.

13. 8-[γ-(2-Ethylamino-4-fluorobenzoyl)propyl]1-phenyl-4-oxo-1,3,8-triazaspiro[4,5]decane.

14. 8[γ-(2-Acetamino-4-fluorobenzoyl)propyl]1-phenyl-4-oxo-1,3,8-triazaspiro[4,5]decane.

15. 8-[γ-(2-Benzoylamino-4-fluorobenzoyl)propyl]1-phenyl-4-oxo-1,3,8-triazaspiro[4,5]decane.

* * * * *